(12) United States Patent
Wheeler et al.

(10) Patent No.: US 7,500,056 B2
(45) Date of Patent: Mar. 3, 2009

(54) SYSTEM AND METHOD TO FACILITATE RESET IN A COMPUTER SYSTEM

(75) Inventors: Andrew Ray Wheeler, Fort Collins, CO (US); James Robert Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 11/089,586

(22) Filed: Jul. 21, 2004

(65) Prior Publication Data

US 2006/0020758 A1      Jan. 26, 2006

(51) Int. Cl.
G06F 12/00    (2006.01)

(52) U.S. Cl. .................................. 711/118; 711/137
(58) Field of Classification Search ................. None
See application file for complete search history.

(56) References Cited

U.S. PATENT DOCUMENTS

| | | | |
|---|---|---|---|
| 6,397,303 B1 * | 5/2002 | Arimilli et al. ............. 711/141 |
| 6,542,981 B1 * | 4/2003 | Zaidi et al. ................... 712/2 |
| 6,550,020 B1 * | 4/2003 | Floyd et al. ................. 714/10 |
| 6,633,968 B2 * | 10/2003 | Zwiegincew et al. ........ 711/213 |
| 6,829,762 B2 * | 12/2004 | Arimilli et al. ............... 718/1 |
| 6,851,029 B2 * | 2/2005 | Matsunami et al. ......... 711/154 |
| 6,988,170 B2 * | 1/2006 | Barroso et al. ............. 711/141 |
| 7,015,921 B1 * | 3/2006 | Trivedi et al. .............. 345/557 |
| 7,036,040 B2 * | 4/2006 | Nicholson et al. ............. 714/6 |
| 7,073,016 B2 * | 7/2006 | Zitlaw ....................... 711/103 |
| 7,139,909 B2 * | 11/2006 | Lee ............................ 713/100 |
| 2003/0120910 A1 * | 6/2003 | Schmisseur et al. ............ 713/2 |
| 2004/0076069 A1 * | 4/2004 | Voth et al. .................. 365/232 |
| 2005/0283597 A1 * | 12/2005 | Holzmann .................... 713/2 |
| 2005/0289286 A1 * | 12/2005 | Ohwada ....................... 711/1 |
| 2006/0200632 A1 * | 9/2006 | Tremblay et al. ........... 711/141 |

* cited by examiner

Primary Examiner—Hyung S Sough
Assistant Examiner—Ngoc V Dinh

(57) ABSTRACT

One disclosed embodiment may comprise a computer system that includes at least one processor having at least one cache. An interface includes an associated cache, the interface preloading the associated cache with instruction data acquired from non-volatile memory as part of a reset sequence so that the instruction data in the associated cache is available to the at least one cache of the at least one processor to facilitate reset by the computer system.

29 Claims, 4 Drawing Sheets

SYSTEM AND METHOD TO FACILITATE RESET IN A COMPUTER SYSTEM

BACKGROUND

When a computer is first turned on or is otherwise reset, a central processing unit implements a reset function to validate and initialize components in the system. When there is more than one CPU or multiple processor cores, each performs a similar reset function. The reset function typically is stored in non-volatile memory as a Basic Input-Output System (BIOS). As an example, the CPU reads instructions from a location in non-volatile memory corresponding to a reset vector. Usually, during a first phase of the reset function, the local cache is validated based on executable instructions are read from the non-volatile memory. The CPU then executes instructions that are stored in the local cache to validate and perform diagnostics for other components of the CPU, including one or more processor cores and associated caches. After the processor cores and caches have been validated, the reset sequence can continue to complete the initialization sequence.

SUMMARY

One embodiment of the present invention may comprise a computer system that includes at least one processor having at least one cache. An interface includes an associated cache, the interface preloading the associated cache with instruction data acquired from non-volatile memory as part of a reset sequence so that the instruction data in the associated cache is available to the at least one cache of the at least one processor to facilitate reset by the computer system.

Another embodiment of the present invention may comprise a computer system that includes a plurality of processor cores, each having an instruction cache. Non-volatile memory stores instruction data for at least one of the instruction caches of the plurality of processor cores. An interface is remote from the plurality of processor cores, the interface comprising a cache that is accessible by the plurality of processor cores. The interface copies a subset of instruction data from the non-volatile memory to the cache of the interface to facilitate responding to requests for the instruction data from the plurality of processor cores based on the subset of the instruction data stored in the cache of the interface.

Another embodiment of the present invention may comprise a multi-processor computer system that includes a plurality of processors, each having at least one processor core. At least one instruction cache is locally associated with each of the processor cores. A shared cache is remote from the plurality of processors, the shared cache being loaded with instruction data as an initial part of a reset process and making the instruction data loaded therein accessible to the at least one processor core of the plurality of processors so as to, during an initial phase of a reset sequence, facilitate transfer of an initial subset of the instruction data to the at least one instruction cache associated with each of the plurality of processor cores.

Still another embodiment of the present invention may comprise a system that includes means for preloading a remote cache with a subset of instruction data from non-volatile memory and means for providing shared access to the instruction data in the remote cache to facilitate a reset sequence by a plurality of processor cores.

Yet another embodiment of the present invention may comprise a method that includes preloading a remote cache with a subset of instruction data from non-volatile memory during a reset condition, and providing shared access to the instruction data, including the subset of instruction data preloaded in the remote cache, by responding with corresponding instruction data to requests from a plurality of processor cores.

DETAILED DESCRIPTION

Figure 1:
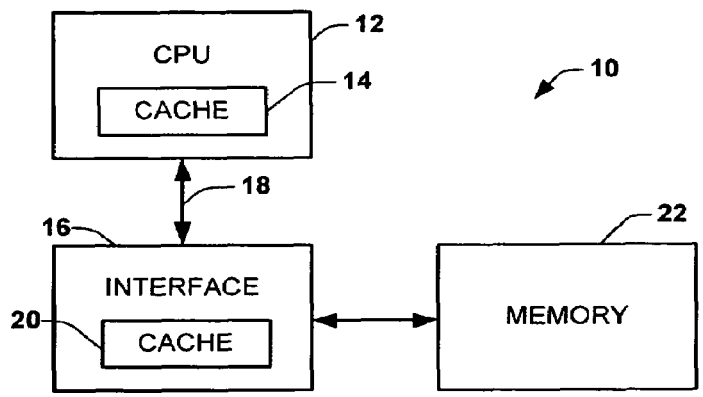
FIG. 1 depicts an embodiment of a system to facilitate reset in a computer system.

FIG. 1 depicts an example of a computer system 10 configured to facilitate the system. The system 10 includes one or more central processing units (CPUs) 12. The CPU 12 can include one or more associated caches, indicated at cache 14. The I-cache as well as the D-cache can be implemented as volatile memory, such as static random access memory (SRAM) or dynamic RAM (DRAM). The cache 14 thus can include a data structure for storing cache lines, including address information and state information associated with such cache lines. The data stored in the cache 14 of the CPU 12 typically comprises coherent data for which coherency is maintained according to a designated cache coherency protocol. The cache 14 may further include one or more separate cache stores, such as an instruction cache (I-cache) and a data cache (D-cache). An I-cache corresponds to a dedicated cache directly connected to the processor core. The I-cache typically is a level I cache, although it may be implemented as a level II cache. Those skilled in the art will appreciate various non-directory-based and directory-based coherency protocols (e.g., MSI, MOSI, and MOESI protocols) that can be employed to maintain cache coherency.

When a reset condition occurs, the cache 14 of the CPU 12 initially contains no valid data, as the cache is a volatile memory structure. A reset condition can occur at power-up or in response to another reset condition, such as a user-initiated soft reset. When a reset condition is initiated, the CPU 12 (e.g., one or more processor cores thereof) requests instruction data for the cache 14. The CPU 12 provides the requests for data to an associated interface 16 via a communication link 18. The communications link 18, for example, can include a processor BUS, a system BUS as well as one or more other interconnect networks (e.g., switch fabric, crossbar etc.) for providing a shared link for connecting the one or more CPUs 12 with the interface 16. Alternatively, the communications link 18 can correspond to a point-to-point link for connecting the one or more CPUs 12 with the interface 16. Those skilled in the art will appreciate various topologies of links that be utilized for communicatively coupling the one or more CPUs 12 with the interface 16.

The interface 16 includes a cache 20, which is remote from the CPU 12. The cache 20, for example, operates as a shared instruction cache that is available to the CPU 12 and any one or more processor cores and cache 14 thereof via the communication link 18. The cache 20 can be configured to store data non-coherently, which reduces the overhead necessary to implement the cache since cache coherency is not required. The interface 16 preloads the cache 20 with instruction data from non-volatile memory 22 during system reset. The non-volatile memory 22 is associated with the interface 16 for storing the basic instruction data, including basic input/output system (BIOS) code for the system 10. The CPU 12 employs the instruction data that is permanently (or semi-permanently) stored in non-volatile memory 22 to validate and initialize components of the system 10 during reset. The non-volatile memory 22 can be a read-only memory (ROM), such as a programmable read-only memory (PROM) (e.g., a flash EPROM). Since a subset of the instruction data can be stored in the cache 20, the CPU 12 can obtain corresponding instruction data from the cache 20 with a reduced latency when compared to the latency associated with obtaining the same data from the non-volatile memory 22.

By way of example, the interface 16 is programmed and/or configured to load (e.g., by copying) a subset of the instruction data from the non-volatile memory 22 in the cache 20. The size of the subset of instruction data that can be stored in the cache 20 generally depends on the size of the cache 20 implemented in the interface. For instance, the subset can range from a single line of the instruction data to the complete set of instruction data that is stored in the non-volatile memory 22. The interface accesses a predetermined start address location in the non-volatile memory 22 to begin the preloading. The start address location can be pre-programmed in the interface (e.g., using hardware or software methods), such as based on the architecture of the system 10.

By way of further example, at reset the CPU 12 issues requests (e.g., read requests) for instruction data. The interface 16 can respond to such requests for the instruction data based on the subset of the instruction data stored in the cache. As mentioned above, a subset of the instruction data is stored in the cache 20 during the reset sequence to facilitate access to such data based on requests issued by the CPU 12. Accordingly, the interface 16 responds with the instruction data from the cache 20 in response to a cache hit for a given request. Alternatively, in response to a cache miss, the interface 16 reads the requested instruction data from the non-volatile memory 22 and provides a corresponding data response to the CPU 12. The CPU 12 stores the instruction data in the cache 14 for execution by the CPU (e.g., by a respective core thereof).

By placing the cache 20 closer to the non-volatile memory 22 (e.g., a critical resource), which stores the BIOS, the cache 20 serves a strategic purpose to significantly reduce access time to the subset of instruction data in the cache 20 by the CPU 12. Those skilled in the art will further appreciate that additional efficiencies can be achieved where multiple processor cores are implemented in one or more CPUs 12. For example, each processor core typically fetches the same instruction data during an initial phase of the reset sequence or boot process. The cache 20 provides a low latency source of an initial set of instructions that can be transferred to the cache 14 for use by the processor cores of the CPU 12 for validation and initialization. After the initial set of instruction data has been stored in the CPU's cache 14 for execution, the reset sequence (or bootstrapping process) can continue more efficiently.

Figure 2:
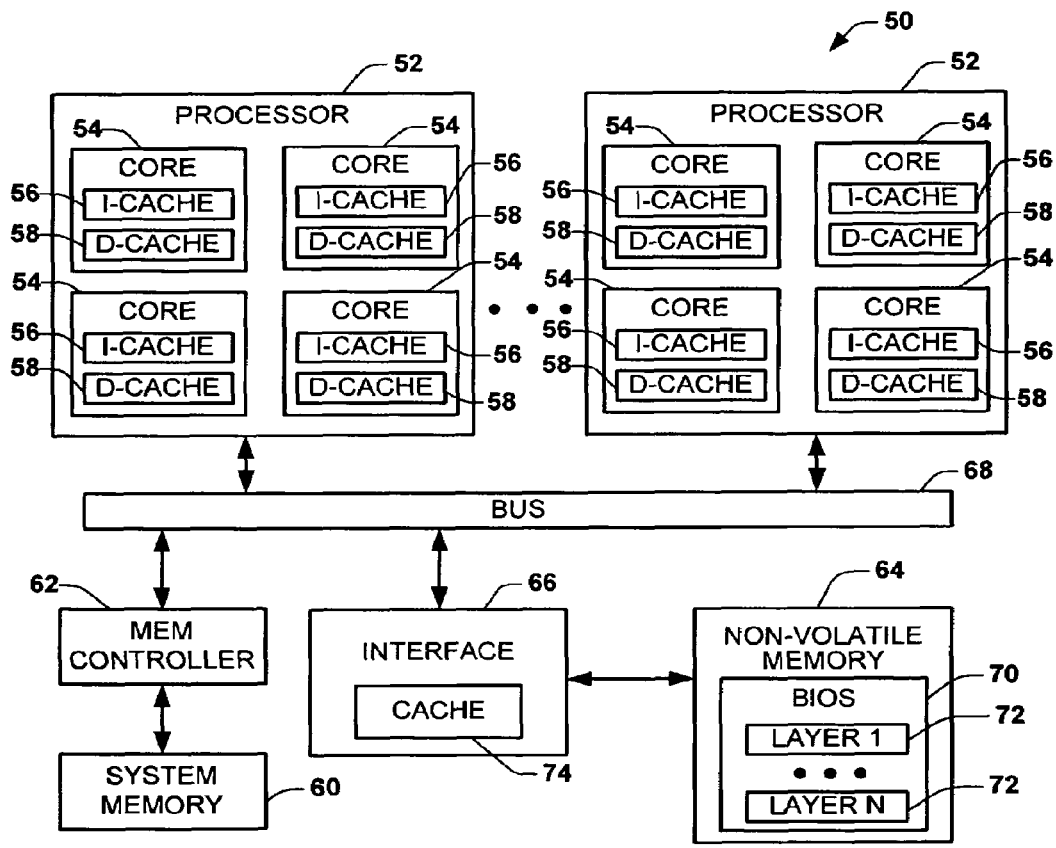
FIG. 2 depicts another embodiment of a system to facilitate reset in a computer system.

FIG. 2 is another example of a computer system 50 configured to facilitate reset or bootstrapping of the system. In the example of FIG. 2, the system 50 includes a plurality of processors 52 to provide a multi-processor computer system. Each processor, which typically is implemented on a separate integrated circuit chip, can include one or more processor cores 54. Each processor core 54 can execute instructions generally independently of the other cores and concurrently.

As shown in FIG. 2, each processor core 54 can include one or more caches, such as an instruction cache (I-cache) 56 and a data cache (D-cache) 58. While, for purposes of explanation the I-cache 56 and D-cache 58 are depicted as being located within the respective cores 54, those skilled in the art will understand and appreciate that the associated cache structures typically will be directly connected to the processor cores 54 within the respective processor 52. The I-cache 56 and D-cache 58 can be implemented, for example, as level I cache stores directly coupled to the respective cores via high speed data link to facilitate access to the data stored in the respective caches.

The core 54 can also include cache controllers (not shown) for maintaining coherency of the data in the respective caches, as well as controlling access to the caches and implementing a request for data that is to be stored as instructions or data in the respective caches 56 and 58. Those skilled in the art will understand and appreciate various cache coherency protocols that can be utilized by the respective cores 54, as well as various data structures that can be utilized to store the data in the respective caches.

The I-cache 56 may be implemented as a volatile memory (e.g., SRAM) that stores instructions to be executed by the processor core 54. The instruction cache 56 helps streamline instruction execution by reducing the number of instruction fetches required to execute a program by the respective processor core 54. Data utilized in conjunction with the instructions can be stored temporarily in the D-cache 58. The processor core 54 thus can access each of the I-cache 56 and the D-cache 58 independently of each other. While each core 54 is depicted as including a separate D-cache 58, alternatively, a single D-cache store can be implemented in each respective processor 52 that is shared by the cores 54 in the respective processor.

Depending upon the operating mode of the system 50 and the processor cores 54, the instructions stored in the I-cache 56 can be obtained from different selected locations in the system. For instance, during an initialization mode, such as corresponding to part of a reset sequence, each I-cache 56 can request a set of initial instructions that is stored in an associated non-volatile memory 64. During the reset sequence, each of the I-caches may request substantially the same sequence of instructions for execution by the respective processor cores 54. During a subsequent part of the reset sequence and during normal operation, the I-caches 56 can obtain instructions from main system memory 60 via an associated memory controller 62.

The non-volatile memory 64 can be communicatively connected to the processors 52 and processor cores 54 via an interface 66 and a corresponding bus 68. The processors 52 and processor cores 54 can communicate locally with each other via the bus 68 (e.g., a processor bus). The interface 66, for example, can correspond to a firmware system or hub that is programmed and/or configured to provide access to the BIOS 70, which is stored in the non-volatile memory 64. Since the I-caches 56 do not initially do not contain instruction data, the respective processor cores 54 provide requests to the system to acquire corresponding instruction data from the BIOS 70. As part of the reset sequence, the processor cores 54 execute the BIOS 70 that is stored in the associated I-cache 56.

The BIOS 70 can include a plurality of layers 72. Each of the respective layers can correspond to a plurality of lines of data that can be read as part of read requests and stored as instruction data in the I-cache 56. For example, a first layer 72 of the BIOS 70 can correspond to a power-on self test (POST), which is a diagnostic program code that is executed to ensure that the various parts of the system 50 are present and functioning properly. The first layer can also include other validation and diagnostic functions that are to be executed by the processor cores 54 during an initial part of the reset sequence or boot process.

To facilitate availability and decrease boot time of the system 50, the interface 66 can include a cache 74. The cache 74 is shared by the processors 52, as well as by the respective processor cores 54. As part of a reset sequence, such as in response to setting a reset mode bit at the interface 66, the interface 66 preloads instruction data from the BIOS 70 and stores the instruction data in the cache 74. The interface 66 can be configured to read lines of instruction data (corresponding to a reset vector) from the non-volatile memory 64 beginning at a predetermined start address of the non-volatile memory. The instruction data stored in the cache 74 can correspond to a subset of the entire BIOS 70, such as one or more layers 72 or a fractional part of a layer. The cache 74 thus provides a shared instruction cache utilized by the processor cores 54 to afford low-latency access to instruction data that is acquired by the I-caches 56 during reset.

The interface 66 thus can employ the cache 74 to service requests (e.g., read requests) from the processor cores 54 located in one or more processors 52 of the system 50. As an example, the instruction data loaded into the cache 74 can correspond to a subset of instruction data from the BIOS 70, beginning at a predetermined address location. For instance, the predetermined address can be programmed or hard-wired in the interface 66 so that access to the subset of instruction data can be facilitated. The initial subset of the instruction data can correspond to a layer 72 or partial layer of the BIOS 70, which can be stored as lines of sequential data in the memory 64.

The subset of instruction data can provide as an initial sequence of instruction data that is temporarily stored in the I-caches 56 and utilized by each of the respective processor cores 54 to perform diagnostic or validation functions. For example, the cores 54 can execute the instruction data that is stored in the I-caches 56, which was obtained from the remote shared cache 74 to begin testing and validating the I-caches 56, the D-caches 58, as well as perform other miscellaneous diagnostics for the core 54 or initialization for the rest of the system 50. The system memory 60 or other system components may also be configured to read instruction data from the cache 74 to perform similar diagnostics and validation functions during reset. Alternatively, one or more of the processor cores 54 can be programmed to perform testing of other system components.

By preloading an initial subset of at least a portion of the instruction data in the remote shared cache 74, the reset of the system 50 can be facilitated. The boot process time can be decreased, for example, since the respective processor cores 54 can read the initial set of instruction data from the shared cache 74, which has a significantly lower latency than if the instruction data were read from the non-volatile memory 64. Accordingly, the overall boot time can be decreased, generally depending on the amount of initial instruction data preloaded in to the cache 74. The decrease in boot time results in further efficiencies commensurate with the number of processor cores in the system 50, as each processor core and I-cache will benefit from the reduced latency associated with accessing instruction data from the cache 74.

Figure 3:
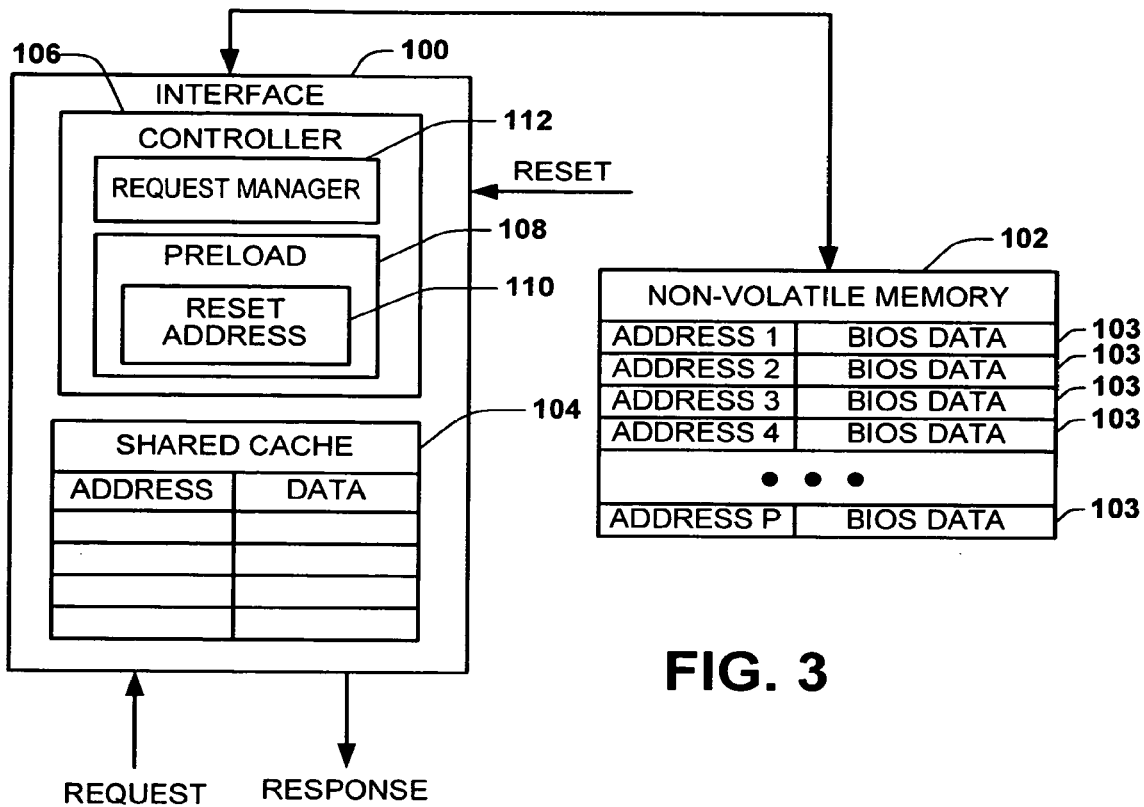
FIG. 3 depicts another embodiment of part of a system that can be employed to facilitate reset.

FIG. 3 depicts parts of a computer system that can be utilized to facilitate reset or boot by a computer system. An interface 100 is communicatively coupled to non-volatile memory 102. The interface 100, for example, can correspond to a firmware hub as well as include one or more other intervening interconnect structures. The interface is communicatively connected between one or more processors and the non-volatile memory 102. The non-volatile memory 102 contains instruction data, including BIOS data. For example, the non-volatile memory 102 includes a plurality of lines 103 of instruction data at corresponding memory address locations, indicated as ADDRESS 1 through ADDRESS P, where P is an integer denoting the number of addresses in association with which respective instruction data is stored. A given line of instruction data 103 can be obtained from the non-volatile memory 102 through a corresponding read request to the associated address for the line of data.

For a given computer system, a reset vector address is architected such that a start location for the reset vector (e.g., comprising a plurality of lines of the instruction data) can be accessed from the non-volatile memory 102. Corresponding instruction data for the reset vector can be preloaded into a shared cache 104 located in the interface 100. The interface 100 includes a controller 106 controls operation of the interface, including access to the non-volatile memory 102.

The controller 106 can include a preload component 106 that is programmed and/or configured to implement preloading of instruction data (e.g., corresponding to a reset vector) into the shared cache 104. The preload component 108 can be preprogrammed or hardwired with a reset address 110 that defines a start address location in the non-volatile memory 102 for the reset vector. The start address location corresponds to a line of the instruction data 103 from which the preload component 106 begins preloading instruction data to the cache 104. The start address as well as any vectoring to additional instruction data can vary depending on the architecture of the computer system. The preload component 108 thus employs the reset address 110 to initiate a read from the non-volatile memory 102 for preloading the shared cache 104 with corresponding instruction data from the non-volatile memory 102.

As an example, the reset address 110 can correspond to a given start address (e.g., ADDRESS N) in the non-volatile memory 102 for the reset vector. The controller 106 can continue reading lines of instruction data sequentially from the non-volatile memory (ADDRESS P-1, ADDRESS P-2, and so forth) for preloading the shared cache 104 with a subset of the instruction data stored in the non-volatile memory 102. As an alternative, the preload component 108 may vector off to read instruction data from another specified address for preloading in the cache 104. The shared cache 104 typically is a smaller cache structure than the I-cache for each of the respective processor cores in the computer system. Accordingly, to facilitate filling the I-caches with the instruction data efficiently, a corresponding eviction policy (e.g., a least recently used algorithm) can be implemented during the reset sequence to evict instruction data from the shared cache 104 and replace the evicted data with a next line of the instruction data 103 in the sequence.

The controller 106 may also include a request manager 112 that is operative to process requests received from components of the associated computer system, such as one or more processor cores. The request manager 112 can implement appropriate flow control for processing the request received from the system. Those skilled in the art will understand and appreciate various types of request managers, queue structures and protocols that can be implemented for processing requests for the instruction data stored in the non-volatile memory 102. In response to a request (received from a processor bus or other interconnect structure), the request manager 112 can first access the shared cache 104 to ascertain whether the requested data is stored in the shared cache. If the stored shared cache contains the requested data (a cache hit), the request manager 112 can provide the requestor a response that includes a copy of the requested instruction data. In the event there is a cache miss, the request manager 112 via the controller 106 can obtain a copy of the requested instruction data 103 from the non-volatile memory 102 based on the address for the requested data and then provide an appropriate data response to the requestor.

The shared cache 104 can also be non-coherent. Accordingly, the cost to implement the shared cache 104 may be less than that typically be required to implement cache with coherency, as in the processor cores where the cost of die area is at a premium. Those skilled in the art will understand and appreciate that such a shared cache will provide additional efficiencies in a multi-processor core system since each processors core usually requires the same initial instruction data during reset. Thus, by preloading the shared cache 104 with a subset of instruction data that is to be executed by the processor cores, boot time can be decreased and thereby result in increased system availability to the user.

Figure 4:
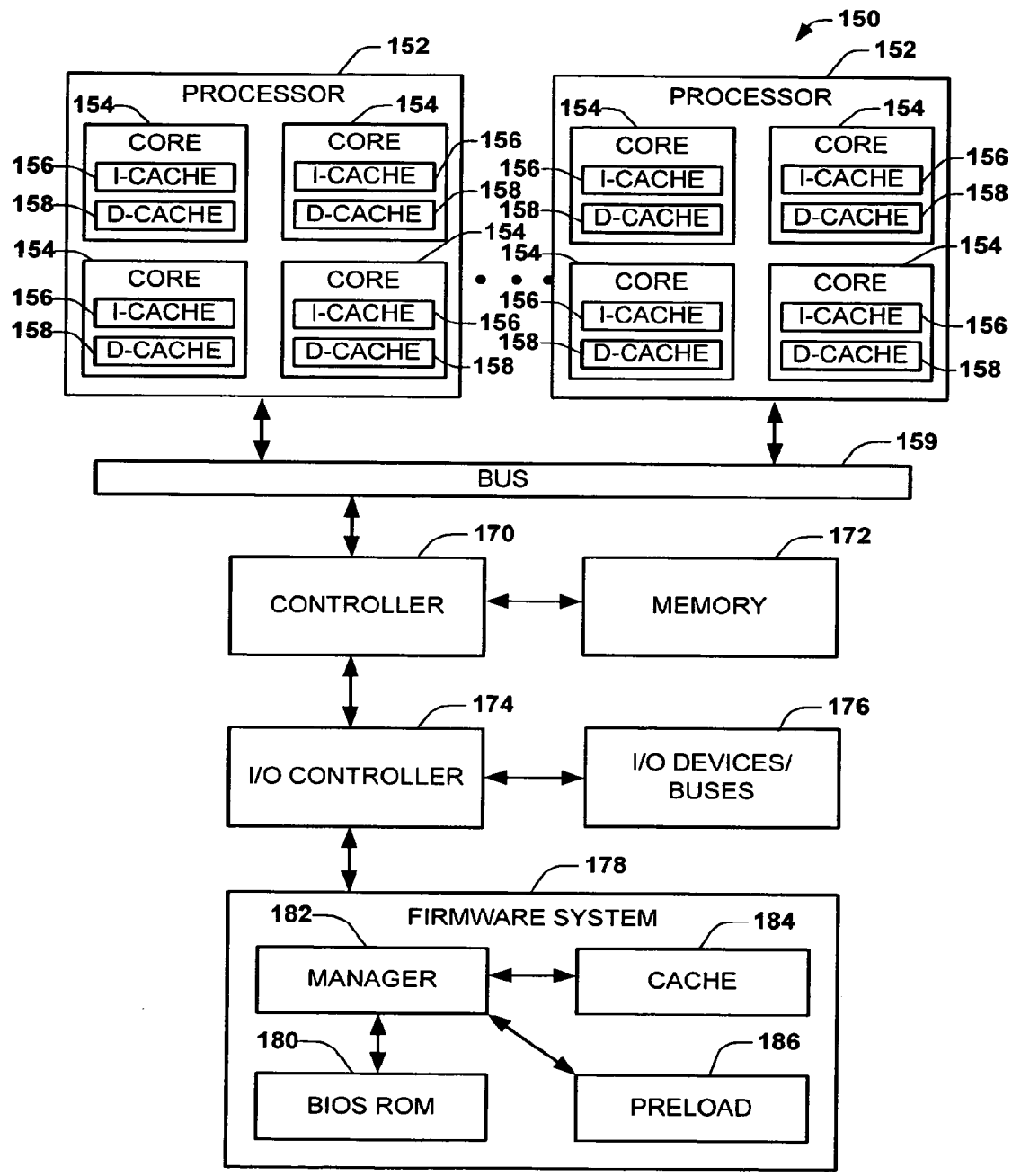
FIG. 4 depicts another embodiment of a system to facilitate reset in a computer system.

FIG. 4 depicts another example of a computer system 150 that can be utilized to facilitate reset or boot for the system. The system 150 includes a plurality of processors 152, each of which can be implemented as a separate integrated circuit chip. Each processor 152 can include one or more processor cores 154 configured to execute instructions stored in an I-cache 156. Each processor core 154 can also include one or one or more D-caches 158, either a separate D-cache per core (as illustrated) or a shared D-cache for a processor or a subset of cores. The I-cache 156 and D-cache 158 can be implemented, for example, as level I cache (e.g., SRAM) directly coupled to the respective cores via high speed data link to facilitate access to the data stored in the respective caches.

The I-cache 56 helps streamline instruction execution by reducing the number of instruction fetches required to execute a program by the respective processor core 54. The processor core 54 thus can access each of the I-cache 56 and the D-cache 58 independently of each other. Each of the processors 152 are communicatively coupled to each other via a processor bus 159.

The system 150 includes a controller 170 coupled to the bus 159 for receiving requests and providing responses to the CPUs 152. The controller 170, for example, can be implemented as a memory controller that is coupled to a system memory 172, such as random access memory (e.g., SRAM or DRAM). The controller 170 thus is operative to manage corresponding requests for data relative to the memory 172.

The controller 170 is also coupled to an I/O controller 174. The I/O controller 174 is coupled to one or more I/O devices and/or busses, collectively indicated at 176. Those skilled in the art will understand and appreciate various devices and bus infrastructures (USB, PCI, etc.) that can be coupled to the I/O controller 174. The I/O controller 174 is also coupled to a firmware system 178. The firmware system 178 provides an interface between the rest of the system 150 and the instruction data stored in a corresponding BIOS ROM 180. The firmware system 178 typically is implemented as a plurality of chips (including a separate BIOS ROM chip), although it could be implemented as a single chip.

The firmware system 178 includes a manager 182 that receives and responds to requests for the instruction data and implements corresponding flow control (e.g., via one or more queues) for such requests and responses. The firmware system 178 also includes a cache 184 that can be preloaded with a selected subset of some or all of the instruction data that is stored in the bias ROM 180. The particular amount of instruction data that is preloaded in the cache 184 depends generally on the size of the cache and the architecture of the system 150. To implement the preloading, the firmware system 178 can include a preload component 186 that operates to retrieve instruction data from the BIOS ROM 180 and preload the cache 184 with such instruction data. The preload component 186, for example, can begin reading instruction data from a predetermined address location of the BIOS ROM 180. The preload component 186 can continue reading instruction data sequentially from the BIOS ROM 180 to store a subset of the instruction data in the cache 184.

The BIOS ROM 180, for example, can be any non-volatile memory device such as flash memory (e.g., a flash EEPROM). The firmware manager 182 thus is operative to employ the preload component 186 in response to a system reset sequence being initiated to set a reset mode at the firmware system 178. The reset sequence can be initiated, for example, in response to setting a reset bit (e.g., a mode register of the firmware system—not shown) at power-up or at a soft reset initiated by a user. As part of an initial start-up function, the firmware system 178 can implement the preload component 186 to preload the cache 184, such as described herein. While preload component 186 is depicted as part of the firmware system 178, the preload component alternatively could be implemented as part of the I/O controller, controller 170 or another intervening component between the firmware system and the bus 159.

Figure 5:
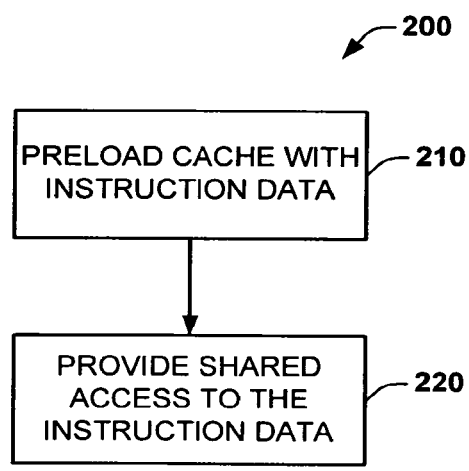
FIG. 5 is a flow diagram depicting an embodiment of a method.
Figure 6:
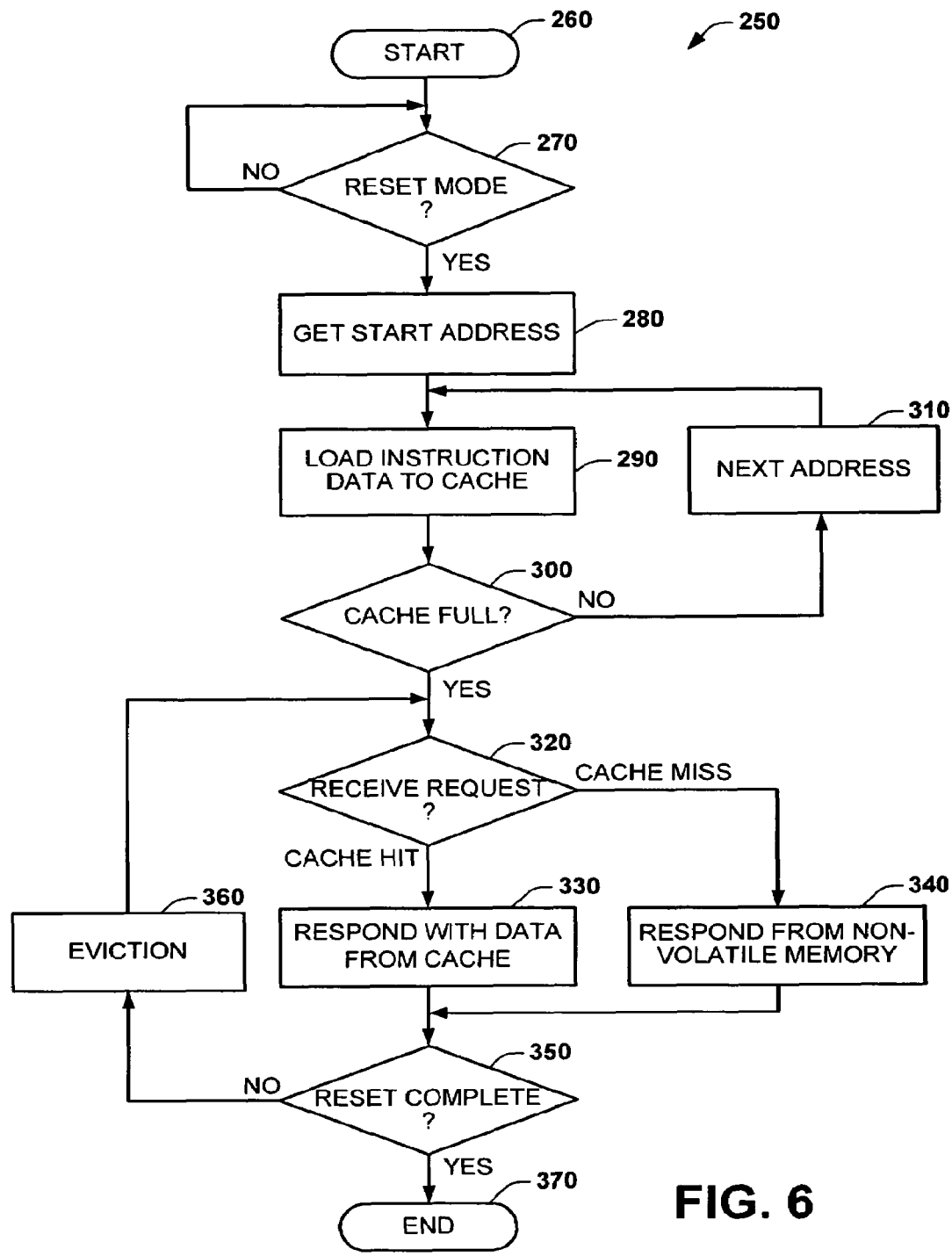
FIG. 6 is a flow diagram depicting an embodiment of a method to facilitate reset sequence of a computer system.

In view of the foregoing structural and functional features described above, certain methods will be better appreciated with reference to FIGS. 5 and 6. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), firmware (e.g., as executable instructions running on one or more processors or controllers), or any combination of hardware and software.

FIG. 5 depicts an example of a method. The method may comprise preloading a remote cache with a subset of instruction data from non-volatile memory during a reset condition, as shown at 210. The method also includes providing shared access to the instruction data, including the subset of instruction data preloaded in the remote cache, by responding with corresponding instruction data to requests from a plurality of processor cores, as shown at 220.

FIG. 6 depicts a flow diagram of a method 250 to facilitate booting or reset of a computer system. As a result of implementing the method 250, increased system availability can be achieved.

The method begins at 260 such as in conjunction with powering up or implementing a rest of the computer system. A determination is made at 270 as to whether the computer system is operating in a reset mode. If the computer system is operating in the reset mode (YES), the method proceeds to 280, otherwise it may loop at 270. At 280, a start address for instruction data is obtained. The start address can be preprogrammed, such as stored in a register or be hardwired for enabling subsequent caching of data.

At 290, instruction data at the start address is read from non-volatile memory and loaded in cache. The cache is remote from the processor cores, such as connected through one or more bus structures (e.g., including a processor bus) and/or interconnects. An interface of the computer system, such as a firmware hub, is coupled to the non-volatile memory to implement the reading of the instruction data for loading the data to the cache at 290. The cache can be implemented as part of the interface.

At 300, a determination is made (e.g., by control logic in the interface) as to whether the cache is full. If the cache can store additional instruction data (NO), the method proceeds to 310. At 310, the interface increments to a next address. Then, at 290, a next line of instruction data is read from the non-volatile memory and loaded to the cache. The method can loop at 290, 300 and 310 to preload the cache until the cache or non-volatile memory is full. After the cache has been loaded with a corresponding subset of instruction data from the non-volatile memory, the method proceeds to 320.

At 320, a determination is made as to whether a request has been received for instruction data. If the request is a cache hit for the instruction data (CACHE HIT), the method proceeds to 330. At 330, a response is provided (e.g., by the interface) that includes a copy of the cached instruction data. If the request results in a cache miss for the requested data (CACHE MISS), the method proceeds form 320 to 340 to provide a response (e.g., by the interface) based on instruction data that is obtained from the non-volatile memory in response to the request. It is to be appreciated that the interface can respond with instruction data from the cache even while the preloading process (290, 300, 310) being implemented. From 330 and 340 the method proceeds to 350.

At 350, a determination is made as to whether the reset sequence has been completed. If the reset sequence (or a pre-designated phase thereof) is not complete (NO), the method proceeds to 360 in which an eviction policy for the cache can be implemented. For instance, the eviction policy (e.g., least recently used line of data) can evict corresponding data from the cache on an as needed basis. From 360, the method returns to 310 to increment to a next address for reading a next line of instruction data sequentially from the non-volatile memory. The instruction data is then loaded into the cache to facilitate access to such instruction data by the processor cores. When, at 350, the reset sequence has completed (YES), the method can end at 370.

What have been described above are examples of the present invention. Since it is not possible to describe every conceivable combination of components or methodologies for purposes of describing the present invention, one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer system comprising:
    at least one processor comprising a plurality of processor cores, each of the plurality of processor cores having at least one cache; and
    an interface that includes an associated cache that is shared by each of the plurality of processor cores, the interface preloading the associated cache with instruction data fetched by the interface from a predetermined address in non-volatile memory as part of a reset sequence so that the instruction data in the associated cache is available to each cache that is associated with a processor core to facilitate reset by the computer system, wherein the instruction data preloaded into the associated cache comprises instructions executable by at the at least one processor for at least one of testing and validating at least one of the at least one cache and at least one processor core of the plurality of processors cores.

2. The system of claim 1, further comprising a processor bus communicatively coupled between the at least one processor and the interface to provide a communications path for requests and responses for the instruction data.

3. The system of claim 1, the interface being directly coupled with the non-volatile memory.

4. The system of claim 1, wherein the instruction data preloaded in the associated cache further comprises non-coherent data.

5. The system of claim 1, wherein the interface comprises a firmware system that one of (i) directly coupled to the non-volatile memory or (ii) includes the non-volatile memory.

6. The system of claim 1, wherein the interface further comprises a controller operative to load the instruction data from the non-volatile memory and store the instruction data in the associated cache of the interface in response to the system operating in a reset mode.

7. The system of claim 1, wherein the associated cache of the interface responds to requests from the plurality of processor cores with the instruction data based on the instruction data stored in the associated cache.

8. The system of claim 1, wherein the at least one processor further comprises a plurality of processors, each of the plurality of processors including at least one of the plurality of processor cores.

9. The system of claim 1, wherein a given cache of the at least one cache of a given processor core comprises an instruction cache for storing the instruction data and a data cache for storing other data.

10. A computer system comprising:
    a plurality of processor cores, each having an instruction cache;
    non-volatile memory that stores instruction data including basic input/output system (BIOS) code for at least one of the instruction caches of the plurality of processor cores; and
    an interface remote from the plurality of processor cores, the interface comprising:
        a cache that is accessible by the plurality of processor cores, the interface copying a subset of instruction data from the non-volatile memory to the cache of the interface such that the interface is configured to respond to requests for the instruction data from each of the plurality of processor cores with corresponding instruction data based on the subset of the instruction data stored in the cache of the interface; and
        a controller configured to load the instruction data from a predetermined address location of the non-volatile memory that defines a start location in the non-volatile memory from where the subset of the instruction data is loaded and store the instruction data in the cache of the interface while operating in a reset mode based on a reset signal.

11. The computer system of claim 10, wherein the interface responds with the instruction data from the cache of the interface in response to a cache hit at the cache of the interface for a given request, and responds with the instruction data from the non-volatile memory in response to a cache miss at the cache of the interface for the given request.

12. The computer system of claim 10, wherein the controller of the interface is further configured to manage requests for the instruction data and responses to the requests for the instruction data.

13. The computer system of claim 10, further comprising a processor bus communicatively coupled between the plurality of processor cores and the interface.

14. The computer system of claim 10, wherein the subset of instruction data loaded in the cache of the interface further comprises instructions executable by the plurality of processor cores for validation of at least part of the computer system.

15. The computer system of claim 10, wherein the subset of the instruction data loaded in the cache of the interface comprises non-coherent data.

16. The computer system of claim 10, wherein the interface comprises a firmware system that is one of (i) directly coupled to the non-volatile memory or (ii) includes the non-volatile memory.

17. The computer system of claim 10, further comprising a plurality of processors, each of the plurality of processors including at least one of the plurality of processor cores.

18. A multi-processor computer system, comprising:
a plurality of processors, each having at least one processor core;
at least one instruction cache locally associated with each of the processor cores; and
an interface comprising:
a shared cache remote from the plurality of processors, the shared cache being loaded with instruction data, including basic input/output system (BIOS) code, as an initial part of a reset process and making the instruction data loaded therein accessible to the at least one processor core of the plurality of processors so as to, during an initial phase of a reset sequence, provide for transfer of an initial subset of the instruction data from the shared cache to the at least one instruction cache associated with each of the plurality of processor cores; and
a preload component configured to load the instruction data from the non-volatile memory to the shared cache, beginning at a predetermined address location of the non-volatile memory.

19. The system of claim 18, wherein, the plurality of processor cores communicate with the interface to access the shared cache via at least a bus.

20. The system of claim 19, further comprising a controller that manages access to the shared cache and to the non-volatile memory by responding with corresponding instruction data from the shared cache in response to a cache hit for a given request from one of the processor cores, and responding with the corresponding instruction data from the non-volatile memory in response to a cache miss for the given request from the one of the processor cores.

21. The system of claim 19, wherein the interface further comprises a firmware system that is one of (i) directly coupled to the non-volatile memory or (ii) includes the non-volatile memory.

22. The system of claim 18, wherein the instruction data loaded in the shared cache further comprises instructions that are stored in the instruction cache of respective processor cores and executable by the respective processor cores for validation of at least part of the system.

23. The system of claim 19, wherein the initial subset of the instruction data further comprises non-coherent data.

24. The system of claim 18, further comprising at least one data cache locally associated with each of the processor cores for storing data other than the instruction data.

25. A system comprising:
means for preloading a remote cache with a subset of instruction data, including basic input/output system (BIOS) code, from a predetermined address in non-volatile memory; and
means for providing shared access to the instruction data in the remote cache to facilitate a reset sequence by a plurality of processor cores by responding with corresponding instruction data based on the subset of instruction data in the remote cache.

26. A method comprising:
preloading a remote cache with a subset of instruction data, including basic input/output system (BIOS) code, from non-volatile memory during a reset condition;
providing shared access to the instruction data, including the subset of instruction data preloaded in the remote cache, by responding with corresponding instruction data to requests from a plurality of processor cores; and
loading instruction data sequentially from the non-volatile memory based on a predetermined start address.

27. The method of claim 26, wherein the subset of the instruction data that is preloaded in the remote cache further comprises non-coherent data.

28. The method of claim 26, further comprising initiating the preloading in response to a reset signal indicative of a reset condition.

29. The method of claim 26, further comprising:
responding with corresponding instruction data from the shared cache in response to a cache hit for a given request from one of the plurality of processor cores; and
responding with the corresponding instruction data from the non-volatile memory in response to a cache miss for the given request from the one of the plurality of processor cores.

* * * * *

UNITED STATES PATENT AND TRADEMARK OFFICE
CERTIFICATE OF CORRECTION

| | | |
|---|---|---|
| PATENT NO. | : 7,500,056 B2 | Page 1 of 1 |
| APPLICATION NO. | : 11/089586 | |
| DATED | : March 3, 2009 | |
| INVENTOR(S) | : Andrew Ray Wheeler et al. | |

It is certified that error appears in the above-identified patent and that said Letters Patent is hereby corrected as shown below:

In column 9, line 64, in Claim 1, delete "by at the" and insert -- by the --, therefor.

In column 12, line 10, in Claim 23, delete "claim 19" and insert -- claim 18 --, therefor.

Signed and Sealed this

Eleventh Day of August, 2009

David J. Kappos
*Director of the United States Patent and Trademark Office*